(12) United States Patent
Nozoe et al.

(10) Patent No.: US 8,291,887 B2
(45) Date of Patent: Oct. 23, 2012

(54) THROTTLE CONTROL DEVICE FOR SADDLE-RIDE TYPE VEHICLE

(75) Inventors: Koichi Nozoe, Wako (JP); Kunihiko Fukui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 12/693,651

(22) Filed: Jan. 26, 2010

(65) Prior Publication Data

US 2010/0212630 A1    Aug. 26, 2010

(30) Foreign Application Priority Data

Feb. 25, 2009  (JP) ................................. 2009-042305

(51) Int. Cl.
*F02D 9/08* (2006.01)
*F02D 9/10* (2006.01)

(52) U.S. Cl. ...................................... 123/403; 123/399

(58) Field of Classification Search .................. 123/399, 123/396, 361, 337, 403; 701/101, 102; 74/504; 73/114.36

See application file for complete search history.

(56) References Cited

U.S. PATENT DOCUMENTS

| 2004/0107789 A1 | 6/2004 | Peppard |
| 2009/0007716 A1* | 1/2009 | Soda et al. ................. 74/504 |

FOREIGN PATENT DOCUMENTS

| EP | 2011728 A1 | 1/2009 |
| JP | 2007-270783 A | 10/2007 |
| WO | 2005/042306 A2 | 5/2005 |
| WO | 2007/146927 A2 | 12/2007 |

OTHER PUBLICATIONS

European Search Report dated Jun. 23, 2010, issued in corresponding European Patent Application No. 10154320.5.

* cited by examiner

*Primary Examiner* — Mahmoud Gimie
(74) *Attorney, Agent, or Firm* — Westerman, Hattori, Daniels & Adrian, LLP

(57) ABSTRACT

A throttle control device for a saddle-ride type vehicle includes a throttle sensor is disposed in a case at a fixed position to detect an amount of a rotation operation of a throttle grip in accordance with a rotation of a throttle pipe. An operation of an actuator which drives a throttle valve to open and close is controlled by a control unit on the basis of a detected value of the throttle sensor. The throttle control device does not require a cancel switch to cancel an operation of an automatic cruise control device, which in turn reduces the number of parts, allowing size reduction of the case fixed on a bar handle.

6 Claims, 7 Drawing Sheets

US 8,291,887 B2

THROTTLE CONTROL DEVICE FOR SADDLE-RIDE TYPE VEHICLE

TECHNICAL FIELD

A throttle control device for a saddle-ride type vehicle, includes a throttle pipe which is rotatably supported on an end portion of a bar handle and which has a portion thereof inserted into a case fixed on the bar handle; a throttle grip which covers the throttle pipe and is attached on the throttle pipe and unrotatable relative thereto, a throttle sensor disposed at a fixed position in the case to detect an amount of a rotation operation of the throttle grip in accordance with a rotation of the throttle pipe; an actuator which drives a throttle valve to open and close the throttle valve; and a control unit which controls an operation of the actuator on the basis of a detected value of the throttle sensor.

BACKGROUND OF THE INVENTION

The following system is known from Japanese Patent Application Publication No. 2007-270783. Specifically, when a rider of a motorcycle rotates a throttle grip, the system causes an electric throttle valve to directly operate, not on the basis of a mechanical movement of a cable connected to a throttle grip, but on the basis of an electric signal from a sensor which electrically detects a rotation amount of the throttle grip. The system also automatically enables a running speed to be kept constant by an automatic cruise control device without the rider's throttle operation.

SUMMARY OF THE INVENTION

However, the system disclosed in Japanese Patent Application Publication No. 1007-270283 has the following configuration. Specifically, a cancel switch detects an event that the throttle grip is rotated to the throttle closing side during the constant-speed running by use of the automatic cruise control device. Then, in accordance with a signal from the cancel switch, the control unit cancels the operation of the automatic cruise control device. Accordingly, such configuration requires the cancel switch to cancel the operation of the automatic cruise control device.

The throttle control device presently disclosed is a device which does not require the cancel switch to cancel the operation of the automatic cruise control device, which in turn reduces the number of parts, and which thereby allows size reduction of the case fixed on a bar handle.

The throttle control device for a saddle-ride type vehicle has a first aspect as follows. The throttle control device includes: a throttle pipe which is rotatably supported on an end portion of a bar handle and which has a portion thereof inserted into a case fixed on the bar handle; a throttle grip which covers the throttle pipe and is attached on the throttle pipe and unrotatable relative thereto; a throttle sensor disposed at a fixed position in the case to detect an amount of a rotation operation of the throttle grip in accordance with a rotation of the throttle pipe; an actuator which drives a throttle valve to open and close the throttle valve; and a control unit which controls an operation of the actuator on the basis of a detected value of the throttle sensor. The throttle control device for a saddle-ride type vehicle comprises an automatic cruise control device that automatically maintains a constant running speed, and when the throttle sensor detects that the throttle grip has been rotated from a fully closed position for fully closing a throttle opening to a throttle closing side, the control unit cancels an operation of the automatic cruise control device.

In addition to the configuration of the first aspect, the device has a second aspect in which: a rotor to be detected by the throttle sensor is housed in the case in a manner to rotate together with the throttle pipe; an abutting projection is formed at a position offset from a rotational axis of the rotor; and repulsive means is supported in any one of the case and a fixing member fixed onto the case, in a manner that the repulsive means abuts on the abutting projection and thereby exerts a resilient force biasing the rotor toward the fully closed position when the rotor rotates from the fully closed position to the throttle closing side, and that the repulsive means is separated from the abutting projection when the rotor rotates from the fully closed position to a throttle opening side.

In addition to the configuration of the second aspect, the device has a third aspect in which: a sensor housing of the throttle sensor is fixedly placed in the case as the fixing member; the repulsive means includes a rod and a spring, the rod being supported in an axially-movable manner by the sensor housing, in a manner that one end of the rod abuts on the abutting projection when the rotor is in the fully closed position and that the one end of the rod is separated from the abutting projection when the rotor rotates from the fully closed position to the throttle opening side, the spring being provided between the sensor housing and the rod, the spring biasing the rod in a direction in which the rod abuts on the abutting projection.

In addition to the configuration of the second or third aspect, the device has a fourth aspect in which the rotor integrally includes: a cylinder-shaped portion surrounding the bar handle and connected to the throttle pipe in a manner to be unrotatable relative thereto; and a collar portion protruding from an outer periphery of the cylinder-shaped portion outward in a radial direction thereof, and the abutting projection projects on one side face of the collar portion.

In addition to the configuration of any one of the first to fourth aspects, the device has a fifth aspect in which resistance adding means is provided between the throttle grip and the case, the resistance adding means adding resistance to the rotation operation of the throttle grip.

Note that an electric motor of the embodiments corresponds to the actuator, and a sensor housing of the embodiments corresponds to a fixing member.

According to the first aspect, when the throttle sensor detects that the throttle grip has been rotated from the fully closed position to the throttle closing side, the control unit cancels an operation of the automatic cruise control device; accordingly, the cancel switch is unnecessary, the number of parts can be reduced, the space for housing the cancel switch does not need to be secured in the case, and thereby the case can be reduced in size.

According to the second aspect, when the rotor rotates from the fully closed position to the throttle closing side, the repulsive means abuts on the abutting projection formed at a position offset from a rotational axis of the rotor to be detected by the throttle sensor and thereby biases the rotor toward the fully closed position; accordingly, the rotor can be prevented from rotating undesirably from the fully closed position to the throttle closing side, preventing undesirable cancellation of the operation of the automatic cruise control device.

According to the third aspect, the repulsive means includes the rod supported by the sensor housing in an axially-movable manner, and the spring provided between the rod and the sensor housing; accordingly, the structure of the repulsive means is simplified.

According to the fourth aspect, the abutting projection is formed in a projecting manner on the one side face of the collar portion protruding from the cylinder-shaped portion outward in the radial direction thereof; accordingly, the repulsive means is allowed to be disposed at a position overlapping with the cylinder-shaped portion of the rotor in a side view, thereby a size increase of the case due to the disposition of the repulsive means can be avoided.

According to the fifth aspect, the resistance adding means produces a rotation load for the throttle grip; accordingly, an adequate rotation load can be exerted for operation of the throttle grip to adjust a rotation amount of the throttle grip, the operating force of which is reduced by causing the throttle sensor to detect the rotation amount electrically.

BRIEF DESCRIPTION OF THE DRAWINGS

The advantages of the invention will become apparent taken in conjunction with the drawings, wherein.

DETAILED DESCRIPTION OF THE INVENTION

Hereinafter, embodiments of the present invention will be described with reference to the accompanying drawings.

Figure 1:
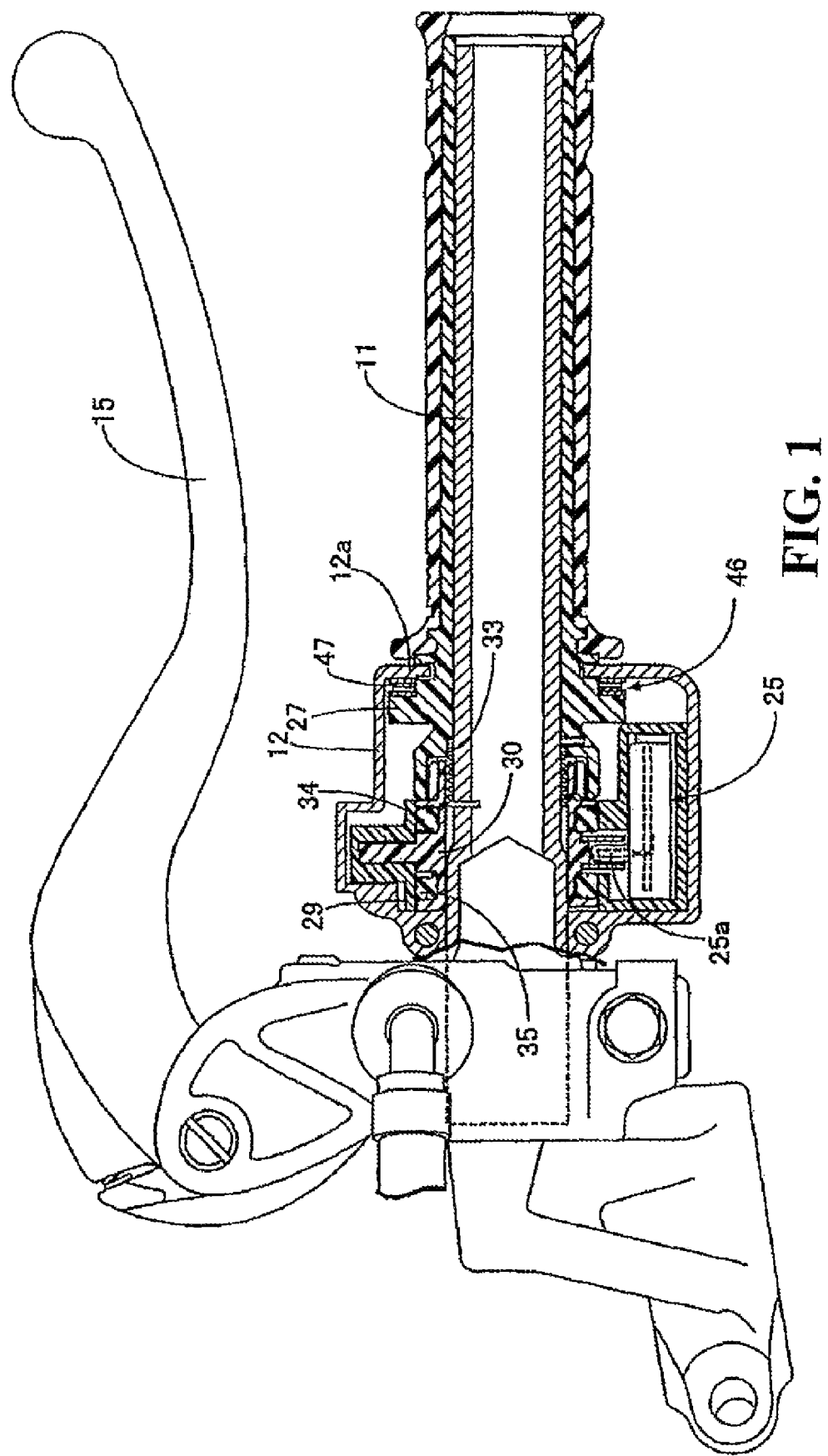
FIG. 1 is a cross-sectional view, seen from above, of a right end portion of a bar handle of Embodiment 1.

Embodiment 1 of the present invention will be described with reference to FIGS. 1 to 7. First, as shown in FIG. 1, a case 12 is fixed on a portion which is near an outer end (right end) of a tubular bar handle 11 provided on a motorcycle, which is a saddle-ride type vehicle. A throttle pipe 13 is rotatably supported on an outer end portion (right end portion) of the bar handle 11, the throttle pipe 13 surrounding the bar handle 11 with its inner end side partially inserted into the case 12. A throttle grip 14 covering the throttle pipe 13 is attached on the throttle pipe 13 in a manner to be unrotatable relative thereto. A brake lever 15 is attached on the bar handle 11 in a pivotally-movable manner. The brake lever 15 can be operated with a rider's right hand holding the throttle grip 14.

Figure 2:
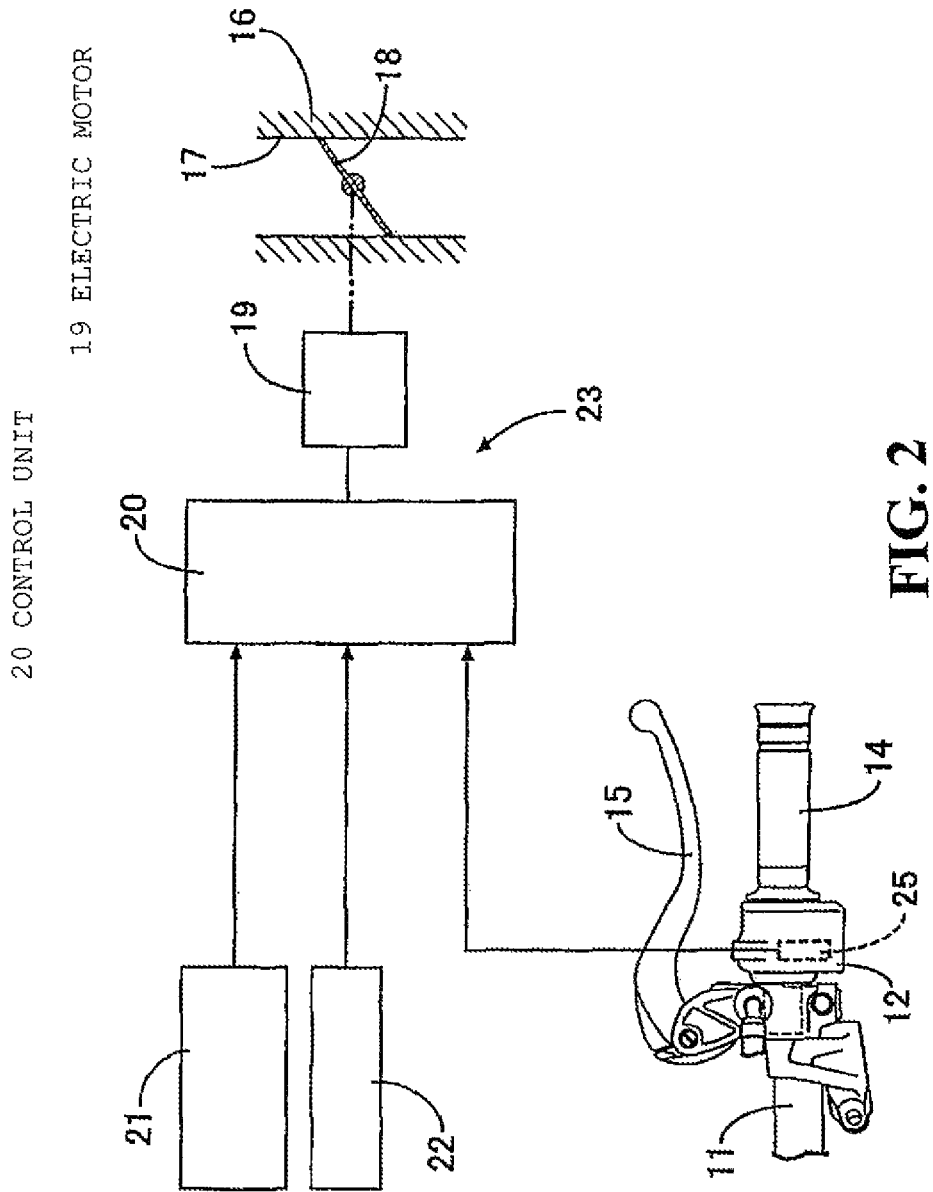
FIG. 2 is a view illustrating a configuration of a throttle control device.

As shown in FIG. 2, a throttle valve 18 is openably and closably supported on a throttle body 16 provided in an intake system of an engine of the motorcycle. The throttle valve 18 controls a flow area of an intake air passage 17 included in the throttle body 16. The throttle valve 18 is driven to open and close by an electric motor 19 being an actuator. An operation of the electric motor 19 is controlled by a control unit 20.

A throttle sensor 25 is disposed in the case 12 at a fixed position to detect a rotation operation amount of the throttle grip 14. A detected value of the throttle sensor 25 is inputted into the control unit 20. The control unit 20 controls the electric motor 19 so that an opening of the throttle valve 18 may take a value corresponding to the detected value of the throttle sensor 25.

Moreover, a signal from an automatic cruise selection switch 21 and a vehicle speed detected by a vehicle speed sensor 22 are inputted into the control unit 20. The automatic cruise selection switch 21 is used for switching between an automatic cruise state and a non-automatic cruise state. When the automatic cruise state is selected with the automatic cruise selection switch 21, the control unit 20 controls the operation of the electric motor 19 to change the opening of the throttle valve 18 so as to maintain the vehicle speed obtained by the vehicle speed sensor 22 at the time of the switching operation on the automatic cruise selection switch 21. Specifically, the control unit 20, the electric motor 19, the automatic cruise selection switch 21, and the vehicle speed sensor 22 constitute an automatic cruise control device 23 that automatically maintains a constant running speed of the motorcycle.

When the throttle sensor 25 detects that the throttle grip 14 has been rotated from the fully closed position for fully closing the throttle opening to the throttle closing side, the control unit 20 cancels an operation of the automatic cruise control device 23.

Figure 3:
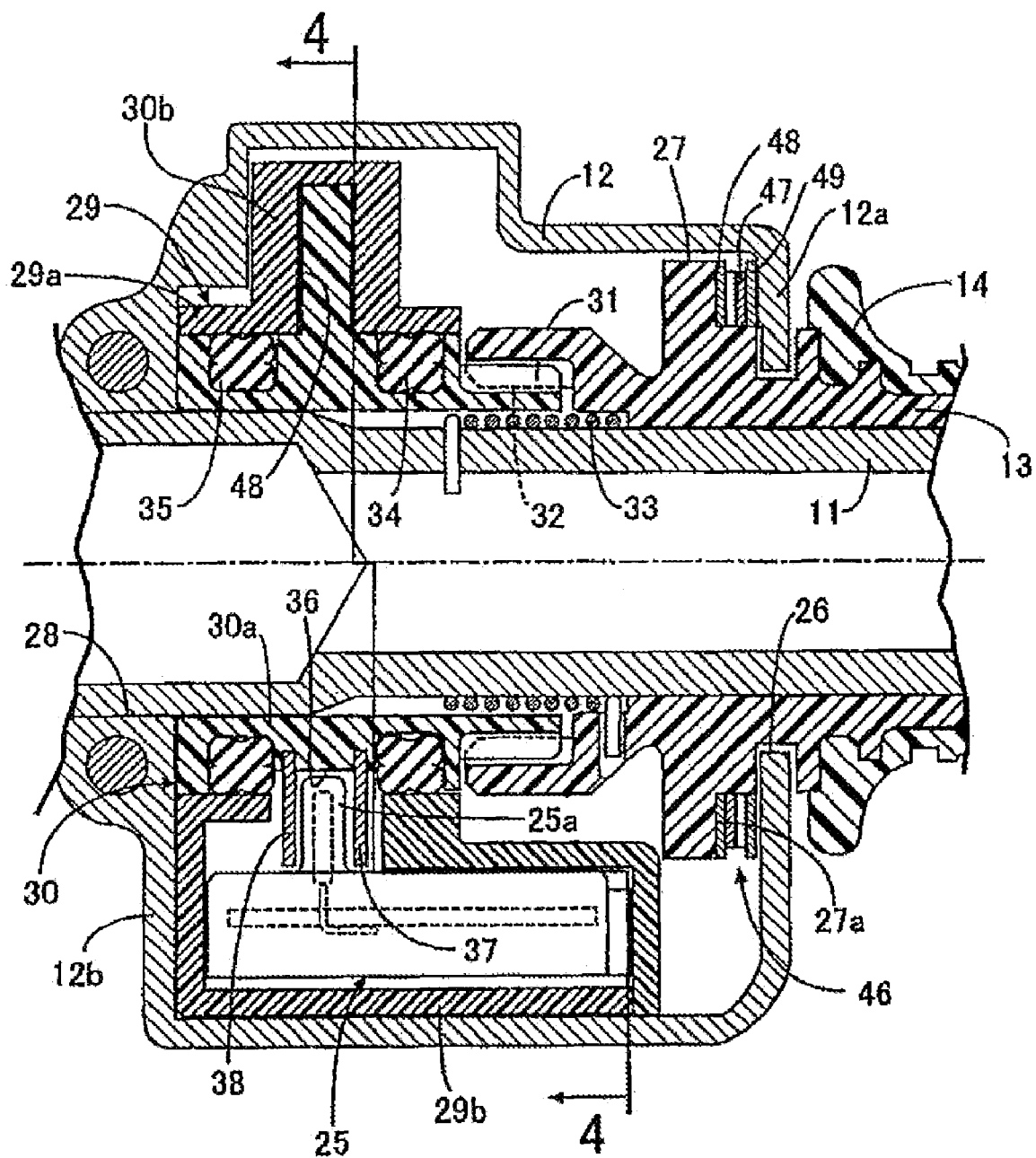
FIG. 3 is an enlarged, cross-sectional view of a main part of FIG. 1, taken along the line 3-3 in FIG. 4.
Figure 4:
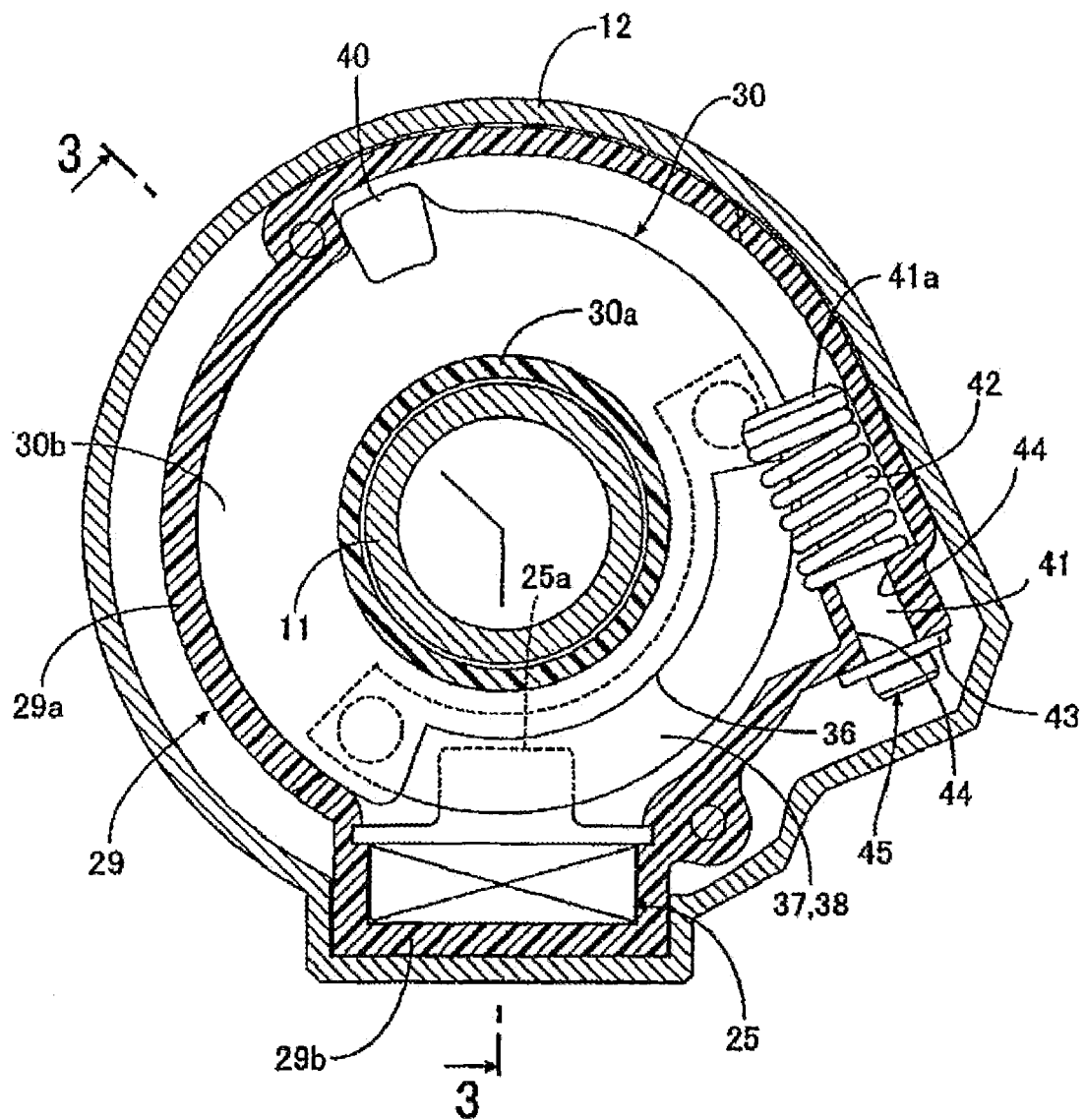
FIG. 4 is a cross-sectional view of the throttle control device in a throttle fully open position, taken along the line 4-4 in FIG. 4.

Referring to FIGS. 3 and 4, the case 12 is structured to be dividable into two, upper and lower pieces. The case 12 has a wall portion 12a that faces the throttle grip 14, and a first insertion hole 26 coaxial with the bar handle 11 and the throttle pipe 13 is formed in the wall portion 12a. An inner end side portion of the throttle pipe 13 is inserted through the first insertion hole 26 into the case 12. A flange portion 27 is integrally formed on the throttle pipe 13, the flange portion 27 facing the wall portion 12a from the inner side. Detachment of the throttle pipe 13 from the case 12 is prevented by the flange portion 27 abutting on the wall portion 12a. The case 12 has a wall portion 12b at opposite side to the throttle grip 14, and a second insertion hole 28 through which the bar handle 11 is inserted is formed in the wall portion 12b.

The throttle sensor 25 is housed and fixed in a sensor housing 29 fixedly placed in the case 12. The sensor housing 29 includes a ring portion 29a and a cylindrical portion 29b. The ring portion 29a is disposed, in the case 12, near the wall portion 12b in the axial direction of the bar handle 11, and surrounds the bar handle 11 coaxially. The cylindrical portion 29b is continuous with one point of the ring portion 29a in the circumferential direction thereof, and extends toward the wall portion 12a. The throttle sensor 25 is housed in the cylindrical portion 29b.

A rotor 30 to be detected by the throttle sensor 25 is housed in the ring portion 29a of the sensor housing 29. The rotor 30 rotates together with the throttle pipe 13. The rotor 30 integrally includes a cylinder-shaped portion 30a surrounding the bar handle 11 and a collar portion 30b protruding from an outer periphery of the cylinder-shaped portion 30a toward the outside in the radial direction thereof. Multiple engaging teeth 31 provided on an outer periphery of one end portion of the cylinder-shaped portion 30a engage with multiple engaging teeth 32 provided on an inner periphery of an inner end portion of the throttle pipe 13, and thereby the cylinder-shaped portion 30a is connected to the throttle pipe 13 in a manner to be unrotatable thereto.

A torsion spring 33 is provided between the bar handle 11 and the throttle pipe 13 in a manner to be partially covered with the cylinder-shaped portion 30a of the rotor 30. The throttle pipe 13 is biased to the throttle closing side by the spring force exerted by the torsion spring 33. In addition, paired annular seal members 34 and 35 are disposed, in the axial direction of the bar handle 11, between the cylinder-shaped portion 30a of the rotor 30 and the ring portion 29a at one of the end portions and at the other one of the end portions, respectively.

A cutout 36 is formed in the collar portion 30b of the rotor 30 by cutting out a part, of the collar portion 30b, having a certain center angle, for example, 80°. Paired arcuate magnetic metal plates 37 and 38 facing each other with a space therebetween in the axial direction of the rotor 30 are fixed onto the collar portion 30b in a manner that the metal plates 37 and 38 are arranged in the cutout 36.

Meanwhile, the throttle sensor 25 is a non-contact magnetic sensor, and a detecting part 25a of the throttle sensor 25 is inserted between the metal plates 37 and 38 so as to detect, without contacting the rotor 30, a rotational position of the rotor 30 which rotates together with the throttle pipe 13.

Figure 5:
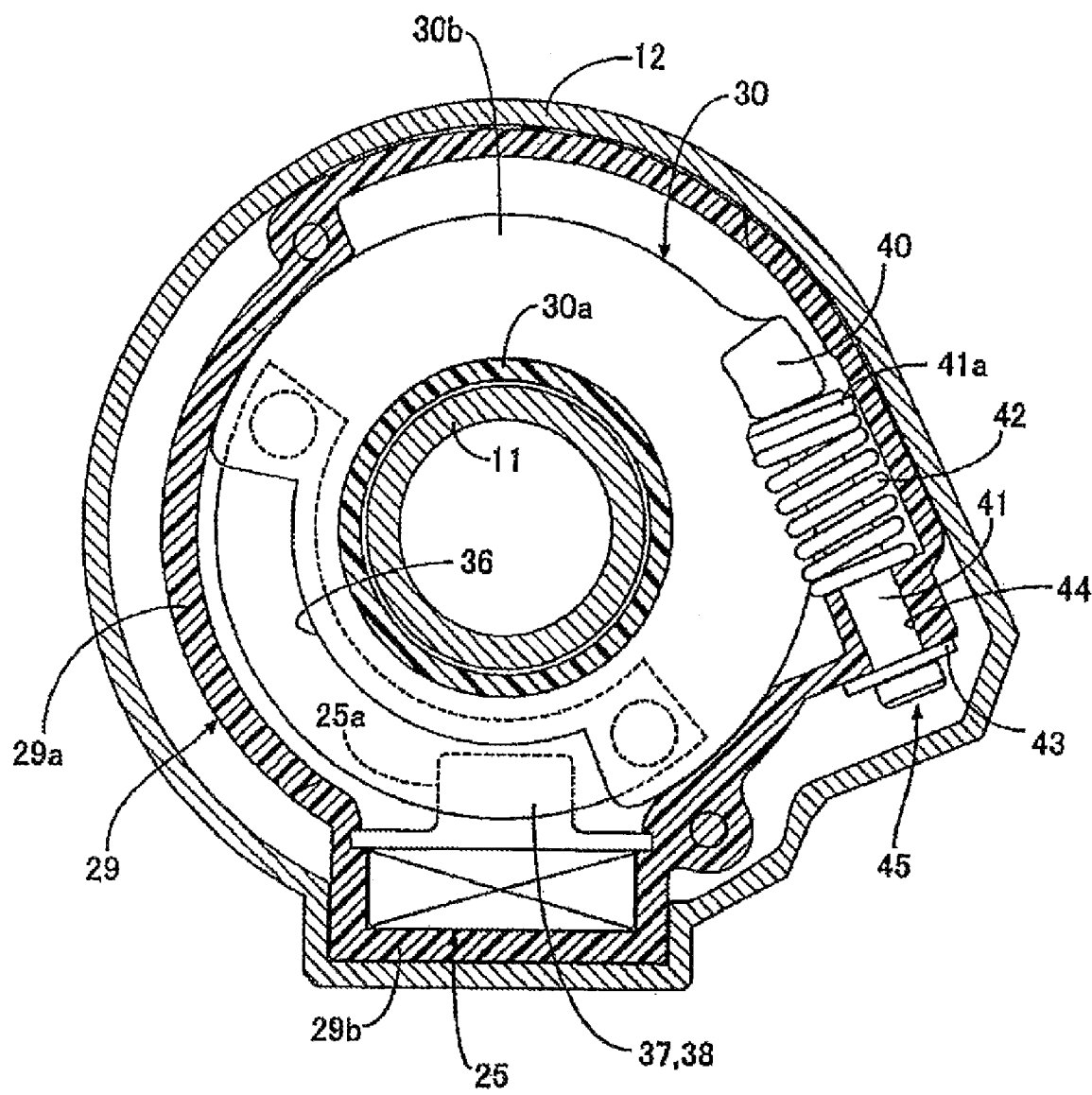
FIG. 5 is a cross-sectional view, corresponding to FIG. 4, of the throttle control device in a throttle fully closed position.
Figure 6:
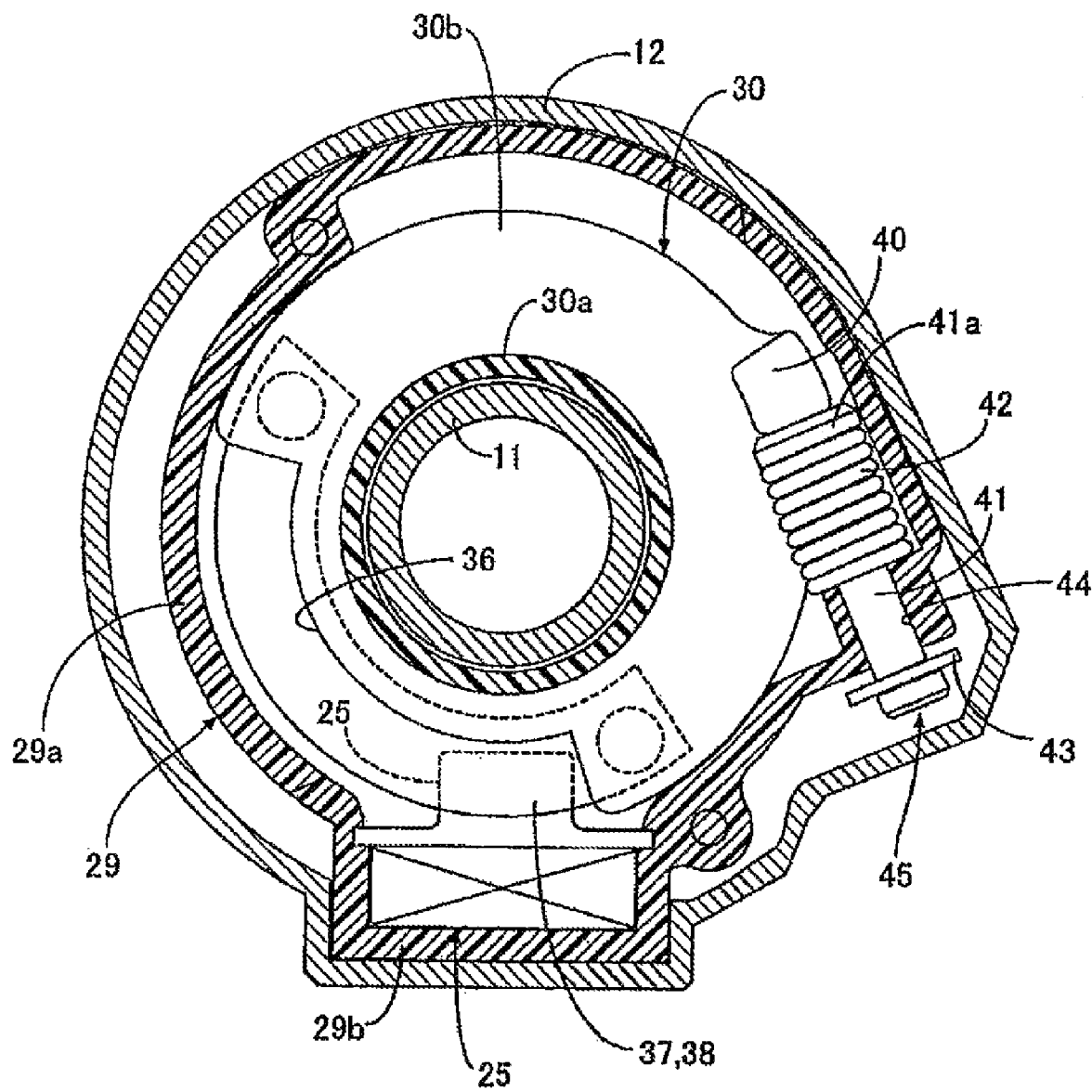
FIG. 6 is a cross-sectional view, corresponding to FIG. 4, of the throttle control device in a state in which an operation is made from the throttle fully closed position to a throttle closing side.

The rotor 30 which rotates together with the throttle grip 13 is rotatable between the fully open position (position shown in FIG. 4) for fully opening the throttle opening and the fully closed position for fully closing the throttle opening by rotating the throttle grip 14 from the fully open position to the throttle closing side as shown in FIG. 5. Besides, as shown in FIG. 6, the rotor 30 is rotatable up to a position which is further shifted slightly to the throttle closing side from the fully closed position by further rotating the throttle grip 14 from the fully closed position to the throttle closing position slightly.

An abutting projection 40 is integrally formed, in a projecting manner, in the rotor 30 at a position offset from a rotational axis of the rotor 30. In Embodiment 1, the abutting projection 40 is integrally formed, in a projecting manner, on one side face of the collar portion 30b of the rotor 30, at a portion near the outer periphery of the collar portion 30b.

Meanwhile, repulsive means 45 is supported in the case 12 or in the sensor housing 29 being a fixing member which is fixedly placed in the case 12. In Embodiment 1, the repulsive means 45 is supported in the sensor housing 29. When the rotor 30 rotates from the fully closed position to the throttle closing side, the repulsive means 45 abuts on the abutting projection 40 and thereby exerts a resilient force, biasing the rotor 30 toward the fully closed position. When the rotor 30 rotates from the fully closed position to the throttle opening side, the repulsive means 45 separates from the abutting projection 40.

The repulsive means 45 includes a rod 41 and a spring 42. The rod 41 is supported in an axially-movable manner by the sensor housing 29. When the rotor 30 is in the fully closed position, as shown in FIG. 5, one end of the rod 41 abuts on the abutting projection 40. The spring 42 is provided between the sensor housing 29 and the rod 41 to bias the rod 41 in a direction in which the rod 41 abuts on the abutting projection 40.

The rod 41 is slidably fitted into a bearing hole 44 formed in the ring portion 29a of the sensor housing 29. In the sensor housing 29, an enlarged-diameter abutment 41a to abut on the abutting projection 40 is provided on the one end of the rod 41, and the spring 42, which is a coil spring surrounding the rod 41, is compressed and disposed between the enlarged-diameter abutment 41a of the rod 41 and the sensor housing 29.

Further, a lock ring 43 is attached on the other end side of the rod 41 projected outward from the sensor housing 29. The lock ring 43 abuts on an outer surface of the sensor housing 29 and restricts the inward movement of the rod 41 in the axial direction thereof.

When the rotor 30 rotates from the fully closed position to the throttle closing side, the enlarged-diameter abutment 41a on one end of the rod 41 abuts on the abutting projection 40, as shown in FIGS. 5 and 6. In contrast, when the rotor 30 rotates from the fully closed position to the throttle opening side, the enlarged-diameter abutment 41a on the one end of the rod 41 separates from the abutting projection 40, as shown in FIG. 4. The abutting projection 40 abuts on the enlarged-diameter abutment 41a when the rotor 30 rotates from the fully open position to the fully closed position.

A resistance adding means 46 is provided between the throttle grip 14 and the case 12 to add resistance to a rotation operation of the throttle grip 14. In Embodiment 1, the resistance adding means 46 is provided on the throttle pipe 13 unrotatable relative to the throttle grip 14, between the flange portion 27 facing the wall portion 12a of the case 12 from the inner side and the wall portion 12a of the case 12.

The resistance adding means 46 includes a ring-shaped first washer 48 contacting the flange portion 27, a ring-shaped second washer 49 contacting the wall portion 12a, and a wave washer 47 is interposed between the first washer 48 and the second washer 49. The resistance adding means 46 is housed in an annular recess 27a formed in an outer peripheral portion of the flange portion 27 on a side facing the wall portion 12a.

In the resistance adding means 46, a resilient force exerted by the wave washer 47 presses the first washer 48 and the second washer 49 onto the flange portion 27 and the wall portion 12a, respectively. Thereby, a friction force occurs between the flange portion 27 and the first washer 48 or between the wall portion 12a and the second washer 49. This friction force produces a rotation load for the throttle pipe 13 and the throttle grip 14.

Next, the effects of Embodiment 1 will be described. When the throttle sensor 25 detects that the throttle grip 14 has been rotated from the fully closed position to the throttle closing side, the control unit 20 cancels an operation of the automatic cruise control device 23. Accordingly, the cancel switch is unnecessary, the number of parts can be reduced, the space for housing the cancel switch does not need to be secured in the case 12, and thereby the case 12 can be reduced in size.

In addition, the sensor housing 29 is housed and fixed in the case 12, and the rotor 30 to be detected by the throttle sensor 25 is housed in the sensor housing 29 and rotates together with the throttle pipe 13. The abutting projection 40 is formed at a position offset from the rotational axis of the rotor 30. The repulsive means 45 is supported in the sensor housing 29. When the rotor 30 rotates from the fully closed position to the throttle closing side, the repulsive means 45 abuts on the abutting projection 40 and thereby exerts a resilient force, biasing the rotor 30 toward the fully closed position. When the rotor 30 rotates from the fully closed position to the throttle opening side, the repulsive means 45 separates from the abutting projection 40. Accordingly, the rotor 30 can be prevented from rotating undesirably from the fully closed position to the throttle closing side, thus preventing undesirable cancellation of the operation of the automatic cruise control device 23.

Further, the repulsive means 45 includes the rod 41 movably supported in the axial direction thereof by the sensor housing 29, and the spring 42 provided between the sensor housing 29 and the rod 41. Accordingly, the structure of the repulsive means 45 is simplified.

In addition, the rotor 30 integrally includes: the cylinder-shaped portion 30a surrounding the bar handle 11 and connected to the throttle pipe 13 in a manner to be unrotatable relative thereto; and the collar portion 30b protruding from the outer periphery of the cylinder-shaped portion 30a outward in the radial direction thereof. Moreover, the abutting projection 40 is formed in a projecting manner on the one side face of the collar portion 30b. Accordingly, the repulsive means 45 is allowed to be disposed at a position overlapping with the cylinder-shaped portion 30a of the rotor 30 in a side view, thereby size increases of the sensor housing 29 and the case 12 due to the disposition of the repulsive means 45 can be avoided.

Furthermore, the resistance adding means 46 is provided between the throttle grip 14 and the case 12 to add resistance to the rotation operation of the throttle grip 14. In Embodiment 1, the resistance adding means 46 is provided on the throttle pipe 13 unrotatable relative to the throttle grip 14, between the flange portion 27 facing the wall portion 12a of the case 12 from the inner side and the wall portion 12a of the case 12. Accordingly, an adequate rotation load is exerted for operation of the throttle grip 14 to adjust a rotation amount of the throttle grip 14, the operating force of which is reduced by causing the throttle sensor 25 to detect the rotation amount electrically.

Embodiment 2 of the present invention will be described with reference to FIG. 7. The parts corresponding to those of Embodiment 1 are illustrated with the same reference numerals, and the detailed descriptions thereof will be omitted.

Repulsive means 45 is supported in a case 12 or in a sensor housing 29 being a fixing member which is fixedly placed in the case 12. In Embodiment 2, the repulsive means 45 is supported in the sensor housing 29. When a rotor 30 rotates from the fully closed position to the throttle closing side, the repulsive means 45 abuts on an abutting projection 40 of the rotor 30 and thereby exerts a resilient force, biasing a rotor 30 toward the fully closed position. When the rotor 30 rotates from the fully closed position to the throttle opening side, the repulsive means 45 separates from the abutting projection 40.

A sliding hole 50 and a receiving hole 51 having a bottom are formed in the sensor housing 29. A rod 41 of the repulsive means 45 slidably passes through the sliding hole 50. The receiving hole 51 has a diameter larger than that of the sliding hole 50 and is coaxially continuous with the sliding hole 50. A coil-shaped spring 42 is compressed and disposed between an enlarged-diameter abutment 41a on one end of the rod 41 and the sensor housing 29. An enlarged-diameter portion 41b, which is the other end of the rod 41, is housed in the receiving hole 51.

Embodiment 2 has the same effect as Embodiment 1 described above.

Figure 7:
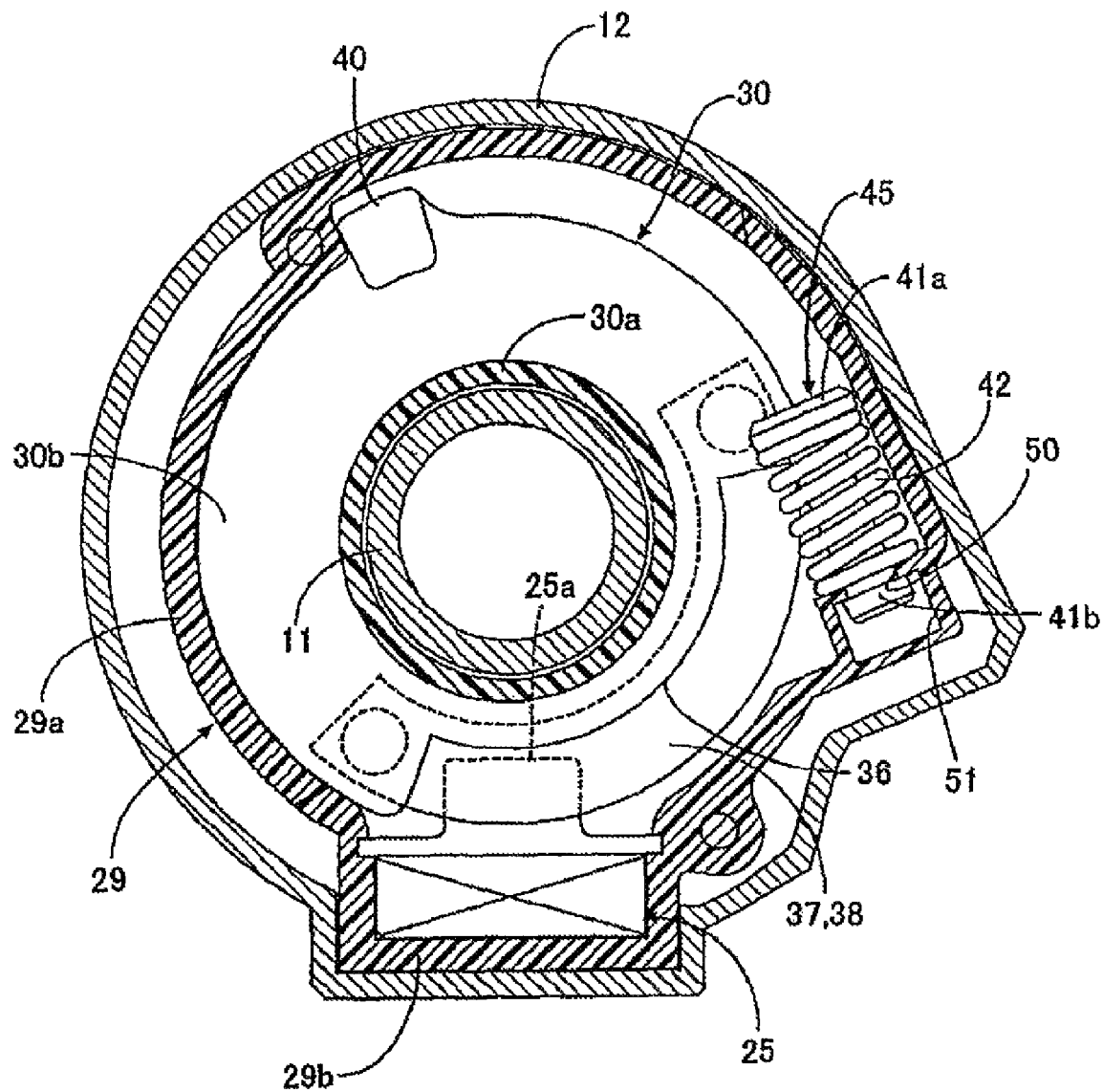
FIG. 7 is a cross-sectional view, corresponding to FIG. 4, of Embodiment 2.

In addition, as another embodiment of the present invention, repulsive means may be configured such that a spring is compressed and disposed in a space between the enlarged-diameter portion 41b, which is the other end of the rod 41, and a closed end of the receiving hole 51 (such space is shown in FIG. 7). As still another embodiment of the present invention, repulsive means may be configured to be supported by the case 12.

While the embodiments of the present invention have been described, the present invention is not limited to the above embodiments, and various design modifications may be made therein without departing from the invention described in the scope of claims.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A throttle control device for a saddle-ride type vehicle, said throttle control device comprising:
    a throttle pipe which is rotatably supported on an end portion of a bar handle and which has a portion thereof inserted into a case fixed on said bar handle;
    a throttle grip which covers said throttle pipe and is unrotatable relative to said throttle pipe;
    a throttle sensor disposed at a fixed position in said case to detect an amount of a rotation operation of said throttle grip in accordance with a rotation of said throttle pipe;
    an automatic cruise control device that automatically maintains a constant running speed, including,
        an actuator which drives a throttle valve to open and close, and
        a control unit which controls an operation of said actuator on the basis of a detected value of said throttle sensor,
    a rotor to be detected by said throttle sensor housed in said case and rotatable together with said throttle pipe;
    an abutting projection formed on said rotor at a position offset from a rotational axis of said rotor; and
    a repulsor supported in either said case or a fixing member fixed onto said case,
    wherein, when said throttle sensor detects that said throttle grip has been rotated from a fully closed position to a throttle closing side, said automatic cruise control device cancels the constant running speed,
    wherein, when said rotor rotates from the fully closed position to the throttle closing side, said repulsor abuts on said abutting projection and thereby exerts a resilient force biasing said rotor toward the fully closed position, and
    wherein, when said rotor rotates from the fully closed position to a throttle opening side, said repulsor is separated from said abutting projection.

2. The throttle control device for a saddle-ride type vehicle according to claim 1,
    wherein said fixing member is a sensor housing of said throttle sensor and is fixedly placed in said case,
    wherein said repulsor includes a rod and a spring, said rod being supported in an axially-movable manner by said sensor housing, said spring being provided between said sensor housing and said rod, said spring biasing said rod in a direction in which said rod abuts on said abutting projection,
    wherein, when said rotor is in the fully closed position, one end of said rod abuts on said abutting projection,
    wherein, when said rotor rotates from the fully closed position to the throttle opening side, said one end of said rod is separated from said abutting projection.

3. The throttle control device for a saddle-ride type vehicle according to claim 2, wherein said rotor integrally comprises:
    a cylinder-shaped portion surrounding said bar handle and connected to said throttle pipe in a manner unrotatable relative to said throttle pipe; and
    a collar portion protruding from an outer periphery of said cylinder-shaped portion outward in a radial direction of said cylinder-shaped portion, and
    wherein said abutting projection projects from one side face of said collar portion.

4. The throttle control device for a saddle-ride type vehicle according to claim 1, wherein a resistance adder is provided between said throttle grip and said case, said resistance adder adding resistance to the rotation operation of said throttle grip.

5. The throttle control device for a saddle-ride type vehicle according to claim 2, wherein a resistance adder is provided between said throttle grip and said case, said resistance adder adding resistance to the rotation operation of said throttle grip.

6. The throttle control device for a saddle-ride type vehicle according to claim 3, wherein a resistance adder is provided between said throttle grip and said case, said resistance adder adding resistance to the rotation operation of said throttle grip.

* * * * *